(12) United States Patent
Ikawa et al.

(10) Patent No.: US 6,181,671 B1
(45) Date of Patent: Jan. 30, 2001

(54) SPINDLE MOTOR AND ITS MANUFACTURING METHOD

(75) Inventors: Yoshihiro Ikawa, Higashiosaka; Teruyuki Takizawa, Neyagawa; Kenji Akimaru, Hirakata, all of (JP)

(73) Assignee: Matsushita Electric Industrial Co., Ltd. (JP)

(*) Notice: Under 35 U.S.C. 154(b), the term of this patent shall be extended for 0 days.

(21) Appl. No.: 09/203,527

(22) Filed: Dec. 1, 1998

(30) Foreign Application Priority Data

Dec. 5, 1997 (JP) .................................................. 9-334703

(51) Int. Cl.$^7$ .................................................. G11B 23/00
(52) U.S. Cl. .................................................. 369/266
(58) Field of Search ............................................. 369/266

(56) References Cited

FOREIGN PATENT DOCUMENTS

| 55-64604 | * | 5/1980 | (JP) | .................................. | 369/266 |
| 57-94954 | * | 6/1982 | (JP) | .................................. | 369/266 |
| 62-14366 | * | 1/1987 | (JP) | .................................. | 369/266 |

* cited by examiner

Primary Examiner—Allen T. Cao
(74) Attorney, Agent, or Firm—Parkhurst & Wendel, L.L.P.

(57) ABSTRACT

To improve the accuracy in holding a disc and to reduce unwanted vibration occurring when the disc is rotated at a high speed (the whirling of a turn table and a rotor), a spindle motor for rotating a disc comprises a turn table (3) that holds a disc (1) to rotate it, a rotor (4) that applies rotational driving force to the turn table, and a rotating shaft (5) provided on the rotation axis of the rotor, wherein the rotating shaft is fixed on the rotation axis of the turn table using a first support member, and the turn table and the rotor are supported by a second support member consisting of a filler filled in a predetermined gap (9).

7 Claims, 10 Drawing Sheets

SPINDLE MOTOR AND ITS MANUFACTURING METHOD

TECHNICAL FIELD

The present invention relates to, for example, a spindle motor in a disc apparatus that rotates a disc.

BACKGROUND ART

Due to the increasing recording density of discs, a spindle motor used in a disc apparatus is required to rotate a disc while holding it precisely, and a disc apparatus is requested to further increase its transfer rate. Accordingly, the disc must be rotated at a high speed.

A configuration of a conventional general spindle motor S is described with reference to the side view in FIG. 8. The spindle motor S comprises a rotor 4 mounted on a fixed portion 10 via a rotating shaft 5 and a turn table 3 (for example, a molding of a synthetic resin) attached to the top of the rotating shaft 5. The rotor 4 is press-fitted and fixed to the rotating shaft 5, and the turn table 3 is also press-fitted and fixed to the rotating shaft 5. In this configuration, a disc 1 is rotated while being sandwiched between the turn table 3 and a clamper 2.

With reference to the block diagram for rotation control in FIG. 9, the control of the spindle motor S in an actual disc apparatus D is described.

A rotation control section 21 drives the spindle motor S using motor driving 22 based on a linear speed instruction 20. A head 24 reproduces a signal from the disc 1, and a linear speed calculation means 26 determines a linear speed 27 from the head reproduced signal 25 as a feedback signal to a rotation control section 21. In this manner, the spindle motor S executes so-called CLV control that uses a signal reproduced from the head to control the rotational speed of the disc 1 in such a way that a linear speed 27 is constant.

In the conventional spindle motor S in which the rotor 4 and the turn table 3 are each press-fitted to the rotating shaft 5, the rotating shaft 5 constitutes the only coupled portion between the turn table 3 and the rotor 4, so the rigidity between these components is weak, resulting in unwanted vibration in the path shown by arrow C as shown by the imaginary lines in FIG. 8.

That is, if the turn table 3 and the rotor 4 are coupled together by simply press-fitting them to the rotating shaft 5, then as they are rotationally driven, whirling occurs in which they move relatively.

The unwanted vibration caused by whirling adversely affects the rotation control characteristics of the spindle and the focus control characteristics of a pickup, thereby making each control system unstable. The effects of this unwanted vibration can be confirmed by measuring the loop characteristic of the control system. This is described with reference to FIG. 9 and the characteristic diagram in FIG. 10 showing a CLV loop of the spindle motor S. FIG. 10 shows a transfer function using the linear-speed instruction 20 as input and the linear speed 27 as output, wherein the horizontal axis indicates the frequency (Hz) while the vertical axis indicates the gain (dB) and phase (deg) of the loop characteristic.

As is apparent from FIG. 10, the gain increases near the frequency of 800 Hz. This is caused the above unwanted frequency, and when the conventional spindle motor S is used to increase the loop gain, the system may oscillate at the frequency of 800 Hz, thereby preventing the follow-up characteristic of disc rotation control from being improved.

The molding thickness of the turn table 3 is reduced to improve the molding accuracy. The reduced thickness of the apparatus limits its height and thus the height of the turn table 3, thereby reducing the rigidity of the turn table. Furthermore, if the bearing of the spindle motor S is a sliding bearing. the diameter of the rotating shaft 5 is reduced to reduce the peripheral speed of the surface of the bearing in order to improve the lifetime expectancy of the bearing for fast rotations. In this case, the rigidity of the rotating shaft 5 decreases.

If the rigidity between the turn table 3 and the rotor 4 decreases as described above, the unwanted vibration is further increased by the vibration mode in which the rotor section 4 and the turn table section 3 including the disc 1 move relatively.

Japanese Patent Application Laid-Open No. 8-195010 discloses a technique for holding the disc 1 precisely. This application discloses a disc chucking mechanism having a centering function.

In addition, Japanese Patent Application Laid-Open No. 9-63164 discloses a technique using a spindle motor S having a disk chucking function in the turn table 3 to account for the reduced thickness and size of the apparatus. In this case, claws provided on the turn table 3 are used to chuck the disc. Either technique, however, is insufficient to restrain the unwanted vibration.

Thus, Japanese Patent Application Laid-Open No. 7-298586 discloses a configuration in which the rotor 4 of the spindle motor S and the turn table 3 are integrated together by means of adhesion or welding and in which the rotating shaft 5 is press-fitted to the turn table 3.

In the spindle motor S disclosed in Japanese Patent Application Laid-Open No. 7-298586, the rotor 4 of the spindle motor S and the turn table 3 are integrated together by means of adhesion or welding, so this configuration is subjected to few effects of the vibration mode in which the turn table 3 and the rotor 4 move relatively.

Since, however, the deflection accuracy of the rotor 4, however, is the sum of the deflection of the turn table 3 and the surface accuracy of the coupled portion between the rotor 4 and the turn table 3, an insufficient shaft deflection accuracy causes the gravity of the rotor 4 section to be biased to increase the unwanted vibration when the spindle motor S is rotated at a high speed.

In addition, the method for welding the turn table 3 has an advantage of eliminating the need to apply an adhesive but has a disadvantage of causing hot distortion (the deformation of resin during a welding process) during welding, thereby hindering the accuracy of the turn table 3 from being controlled.

DISCLOSURE OF THE INVENTION

In view of these points, it is thus an object of this invention to provide a spindle motor that meet both requirements of reducing unwanted vibration occurring when a disc is rotated at a high speed and increasing the accuracy in holding the disc and that is easy to manufacture.

To achieve this problem, this invention comprises a turn table that holds a disc to rotate it, a rotor that applies rotational driving force to the turn table, and a rotating shaft fixed to the rotor on the rotation axis of the rotor, characterized in that the turn table and the rotor are arranged so as to have a predetermined gap therebetween, that the rotating shaft is fixed on the rotation axis of the turn table using a first support means, and that the turn table and the rotor are supported by a second support means consisting of a filler filled in the predetermined gap. The gap between the turn table and the rotor is a gap between the rotor and a protruding portion provided on the turn table in such a manner as to protrude to the rotor, or a gap between the turn table and a protruding portion provided on the rotor in such a manner as to protrude to the turn table. In the second support means, support is provided by filling the gap with an adhesive or an elastic member represented by a silicon rubber.

In addition, the gap between the turn table and the rotor is formed between the protruding portion of the turn table protruding to the rotor and a recessed portion provided in the rotor to oppose to the protruding portion of the turn table, or between the protruding portion of the rotor protruding to the turn table and a recessed portion provided in the turn table to oppose to the protruding portion of the rotor. Alternatively, the recessed portion is a hole into which the protruding portion of the turn table or rotor is loosely inserted to form the gap between the turn table and the rotor. The second support means supports the turn table on the rotational circumference of the rotor at least at three points spaced at an equal angle.

In this configuration, with the filler applied to the rotor or the turn table, the rotating shaft is fixed on the rotation axis of the turn table using the first support means. The filler is then hardened to allow the second support means to support the turn table and the rotor, thereby manufacturing a spindle motor.

This configuration can reduce unwanted vibration occurring due to the low rigidity of the coupled portion between the turn table and the rotor, while achieving a high accuracy in holding the disc. Thus, the unwanted vibration occurring when the disc is rotated at a high speed decreases to contribute to increasing the transfer rate of the disc apparatus. In addition, the rotor and the turn table may be supported on the outer circumferential portion at three or more positions by filling an adhesive or elastic member therebetween. Thus, this configuration requires only a small amount of filler and is unlikely to be affected by the thermal expansion of the adhesive, compared to the fixation along the entire circumference. Moreover, the process is simplified by filling the adhesive or elastic member while simultaneously press-fitting and fixing the turn table and rotor to the rotating shaft (using the first support means). Besides, an adhesion gap can be improved to minimize the leakage of the adhesive in order to make the adhesive layer uniform. This configuration also has an effect of enabling the adhesion process to be easily achieved by providing a certain degree of vertical freedom for press fitting, and reduces the thickness of the spindle motor by using a hole provided in the rotor as an adhesion gap or a section for sandwiching the elastic member.

BEST MODE FOR CARRYING OUT THE INVENTION

Figure 1:
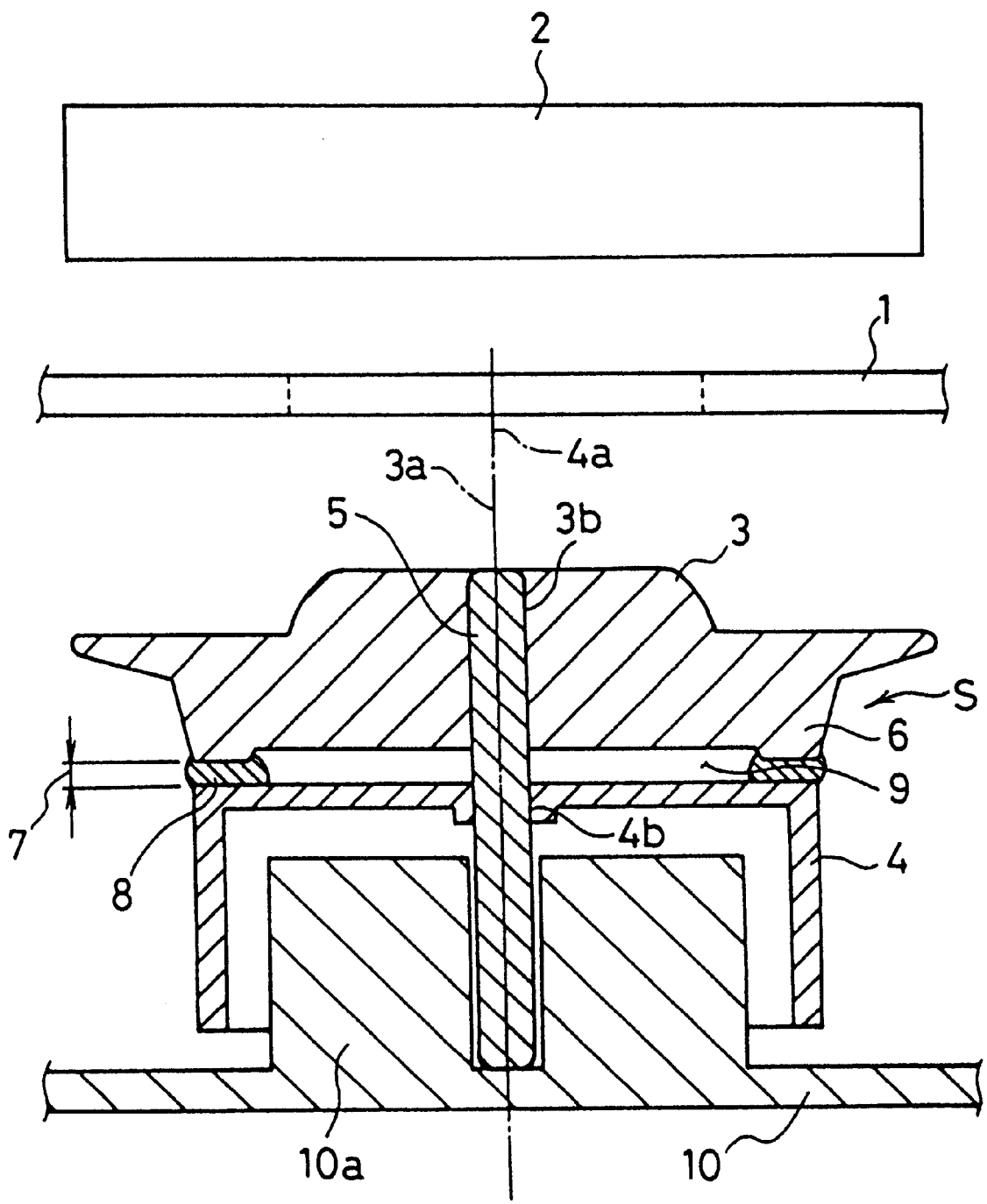
FIG. 1 is a sectional view of a spindle motor showing a first embodiment of this invention.

Spindle motors for disc apparatuses according to the embodiments of this invention are described below with reference to the drawings. A spindle motor S according to a first embodiment of this invention is described with reference to FIGS. 1 to 4. FIG. 1 is a sectional view showing a configuration of the spindle motor S. The spindle motor S is composed of a rotor 4 mounted on a fixed portion 10 via a rotating shaft 5 and a turn table 3 mounted on the rotating shaft 5, The lower part of the rotating shaft 5 is rotatably supported by a shaft receiving section 10a, provided the fixed portion 10.

In FIG. 1, 1 is a disc that is sandwiched by the damper 2 and the turn table 3 and rotates in response to the rotation of the turn table 3. The method for centering the disc is similar to that for the conventional spindle motor S.

An axis hole 4b passing through the axis 4a of the rotor 4 is press-fitted and fixed on the bar-shaped rotating shaft 5. Furthermore, an axis hole 3b passing through the axis 3a (that aligns with the axis 4a of the rotor 4) of the turn table 3 is press-fitted and fixed to the upper part of the rotating shaft 5 (a first support means).

In this manner, the rotor 4 and the turn table 3 are each press-fitted and fixed to the rotating shaft 5, the shaft deflection and height accuracy is controlled, and the turn table 3 and the rotor 4 are arranged at the predetermined gap 9.

An annular protrusion 6 is formed on the bottom of the turn table on its outer circumference, and the narrower gap 9 between the protrusion 6 and the top surface of the rotor 4 is used as an adhesion gap 7. An adhesive 8 is filled in the adhesion gap 7 to stick and fix the turn table 3 and the rotor 4 together (a second support means). The adhesion and fixation using the adhesive 8 are provided as a support means different from the above press-fitting and fixation.

Figure 2:
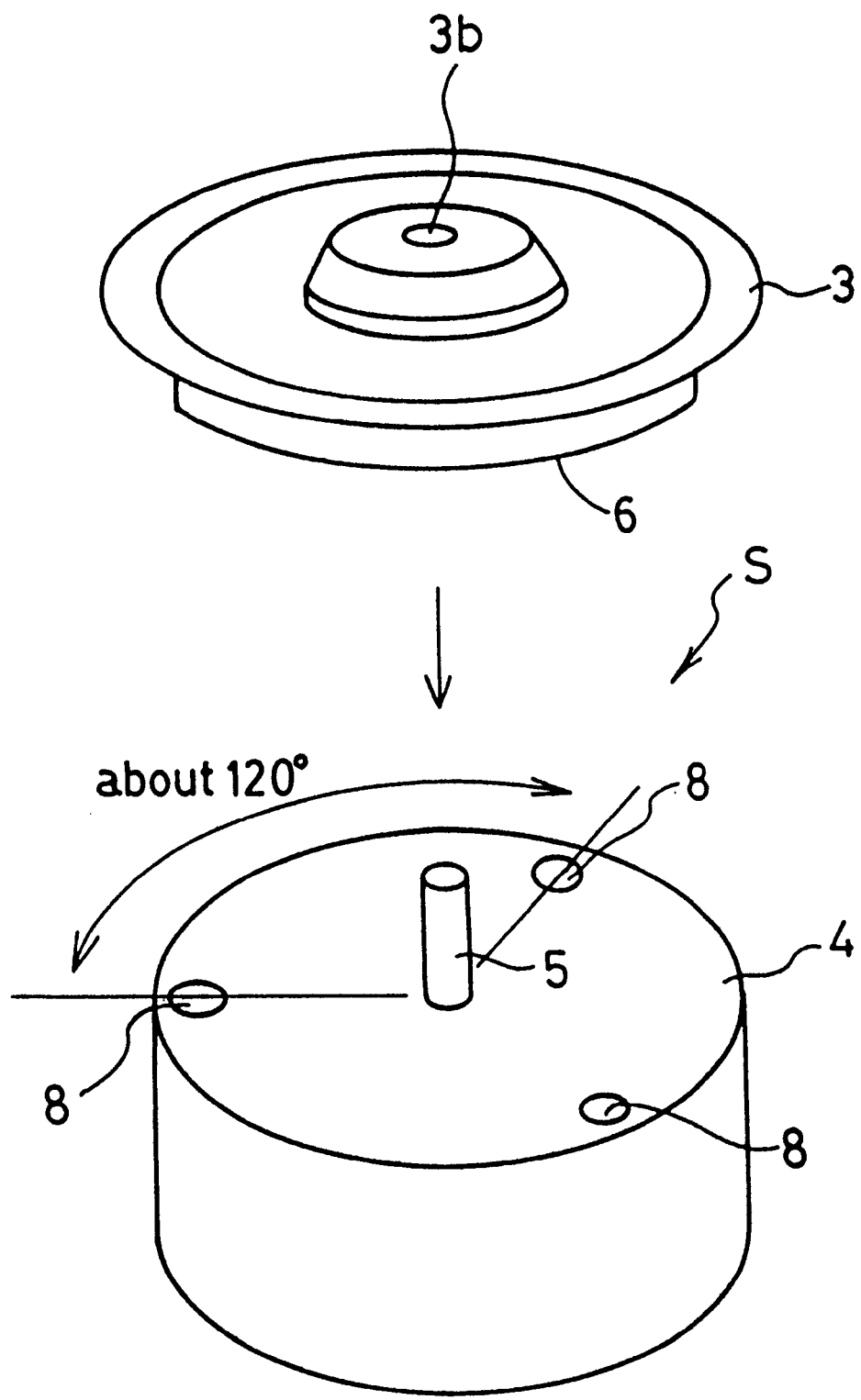
FIG. 2 is a perspective view showing a procedure for adhering and fixing a rotor and turn table together according to the first embodiment.

Next, a procedure for the adhesion and fixation is described with reference to the perspective view in FIG. 2. The rotor 4 press-fitted on the rotating shaft 5 is installed in a jig (not shown). Then, the adhesive 8 is applied to the top surface of the rotor 4. The adhesive 8 is applied to the outer circumference opposed to the protrusion 6 of the turn table 3 and at three positions spaced at an approximately equal angle around the rotating shaft 5. In FIG. 2, the adhesive 8 is applied to three positions spaced at an approximately equal interval (about 120° C.). Subsequently, the turn table 3 is press-fitted and fixed to the rotating shaft 5. As described above, the accuracy in the height and shaft deflection of the turn table 3 is controlled during press-fitting.

During this press-fitting and fixation operation, the adhesive 8 is filled in the adhesion gap 7 between the top surface of the rotor 4 and the protrusion 6 from the turn table 3. In this case, the adhesive 8 spreads through the adhesion gap 7 having a partly narrow gap 9 to limit the range of leakage.

The adhesive 8 is hardened over time to stick and fix the bottom of the turn table 3 and the top surface of the rotor 4 together on the outer circumference.

As described above, the turn table 3 and the rotor 4 are reliably integrated together using the two types of support methods, that is, not only press-fitting and fixing to the bar-shaped rotating shaft 5, the axial hole 4b passing through the axis 4a of the rotor 4 and press-fitting and fixing to the upper part of the rotating shaft 5, the axial hole 3b passing through the axis 3a of the turn table 3 but also adhering and fixing the turn table 3 and rotor 4 together.

The operation of the spindle motor S configured in the above manner is described below. In the spindle motor S of the above configuration, when the turn table 3 and the rotor 4 are press-fitted and fixed to the rotating shaft 5, the heights of the turn table 3 and rotor 4 are controlled. In this case, the dispersion of parts is absorbed by the gap 9 formed between the turn table 3 and the rotor 4. In addition, the deflection accuracy relative to the rotating shaft 5 is controlled during each press fitting process.

Thus, in this spindle motor S, the rotor 4 and the turn table 3 are each press-fitted to the rotating shaft 5, so the accuracy of each component relative to the rotating shaft 5 is appropriate. This is because the deflection accuracy of the rotor 4 relative to the rotating shaft 5 and the deflection accuracy of the turn table 3 relative to the rotating shaft 5 are determined by each part accuracy and each press-fitting accuracy.

If, for example, the turn table 3 and the rotor 4 are stuck together to eliminate the gap 9, an error in each part concerning the flatness of the stuck portion or the parallelism with a surface holding the disc is cumulatively added to the accuracy of the turn table 3. Accordingly, without the gap 9, the shaft deflection accuracy relative to the rotating shaft is degraded compared to the apparatus with of the gap 9.

In addition, the adhesion gap 7 is the narrower portion of the gap 9 and the thickness of the adhesive 8 is minimized as much as possible in this portion. This constitution reduces the expansion of the adhesive caused by the variation of the temperature, thereby maintaining the disc retention accuracy despite the variation of the temperature.

As described above, the spindle motor S holds the disc 1 precisely. In addition, the excellent deflection accuracy relative to the rotating shaft 5 serves to reduce the unwanted vibration occurring when the spindle motor S is rotated at a high speed.

In the conventional spindle motor S, the turn table 3 is fixed to the rotor 4 only via the rotating shaft 5, while in the spindle motor S shown in the first embodiment, the rotor 4 and the turn table 3 are also supported by the adhesive 8 at the adhesion gap 7. This configuration allows the turn table 3 and the rotor 4 to be integrated together to improve their rigidity compared to the prior art. That is, the relative vibration between the turn table 3 and the rotor 4 is reduced by integrating them together. This is because the intervening adhesive 8 holds the relative displacement between the turn table 3 and the rotor 4. This eliminates the factor adversely affecting the rotation control characteristic of the spindle motor S and the focus control characteristic of the pickup.

Figure 3:
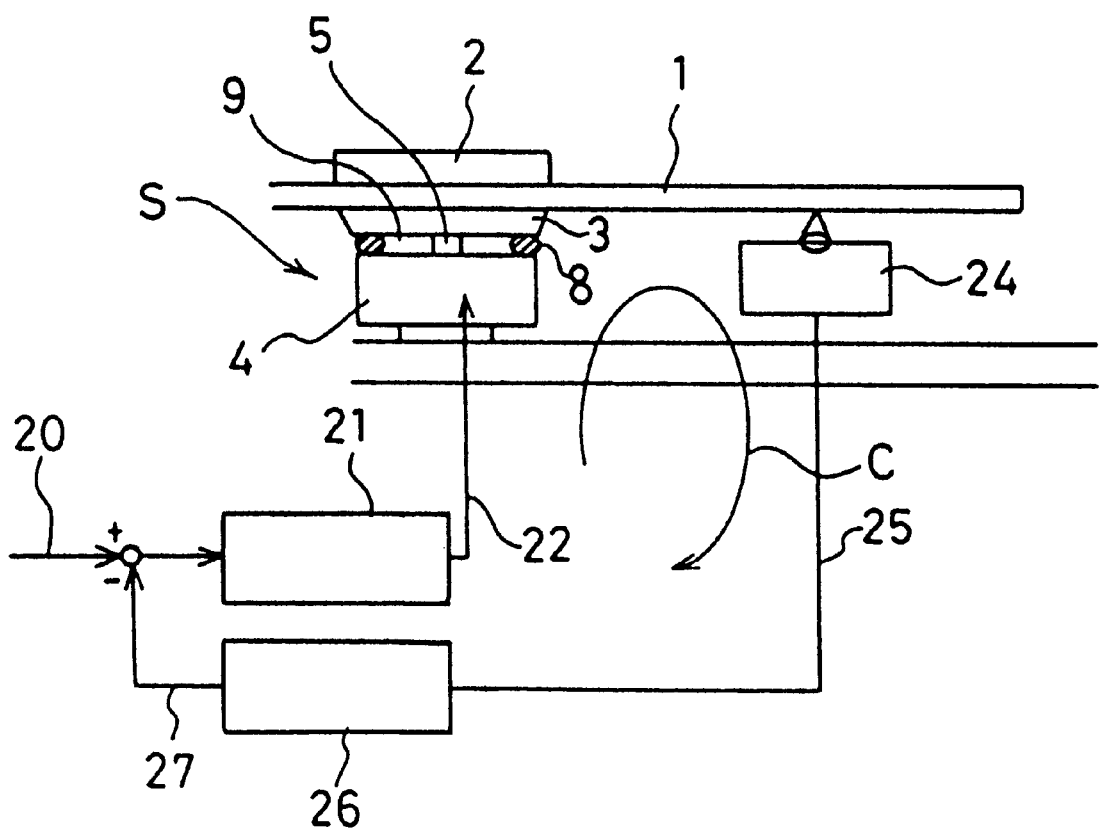
FIG. 3 is a block diagram showing rotation control effected by a spindle motor according to the first embodiment.
Figure 4:
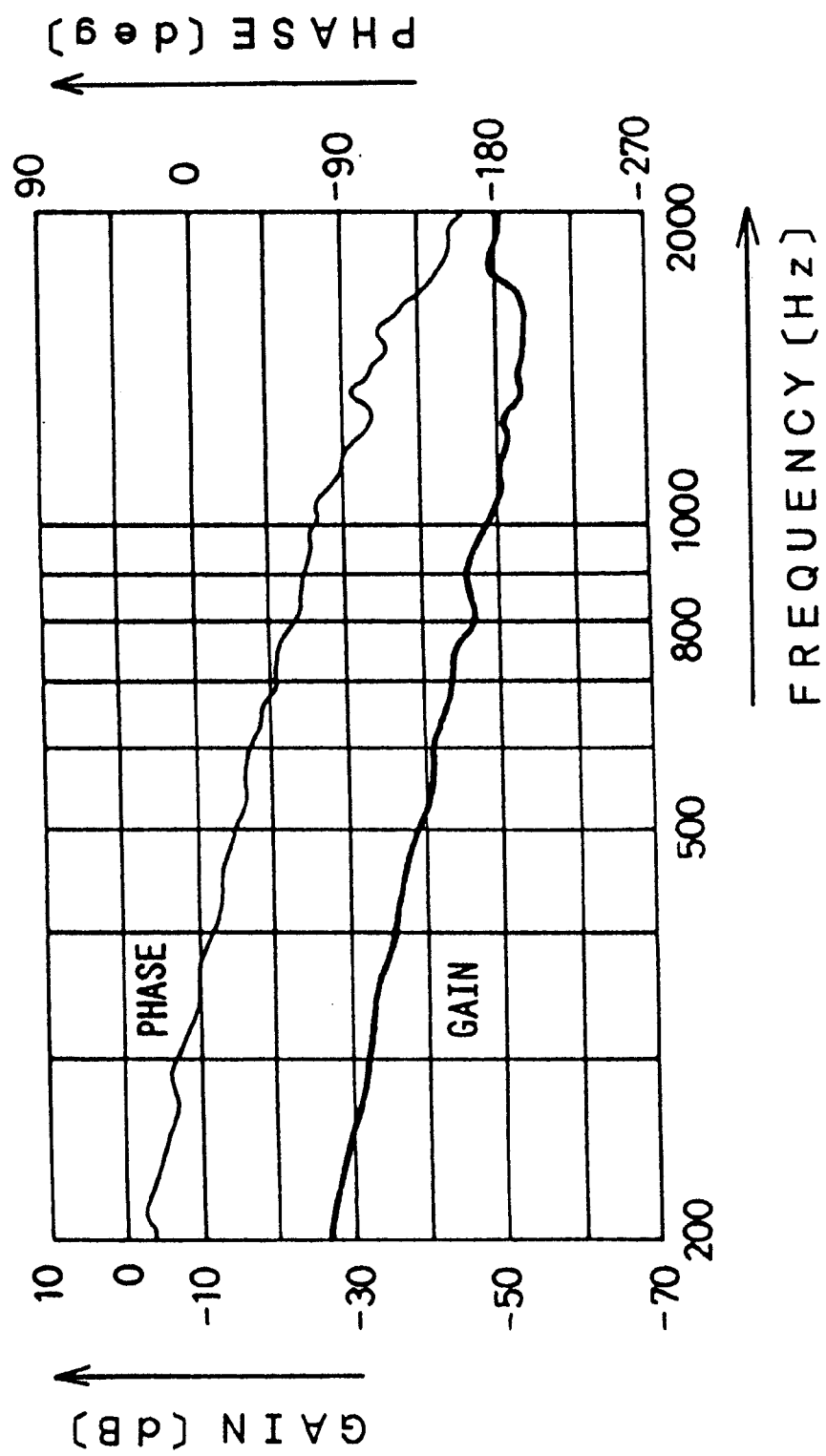
FIG. 4 is a characteristic diagram showing a CLV loop of the spindle motor.

Next, this operation is described with reference to FIGS. 3 and 4. FIG. 3 is a block diagram showing rotation control effected by the spindle motor S.

The spindle motor S normally uses a signal reproduced from the pickup to control the rotational speed of the disc 1 so as to maintain the linear speed constant. This is called "CLV control". In FIG. 3, based on a linear-speed instruction 20, the rotation control section 21 drives the spindle motor S using motor driving 22. A head 24 reproduces a signal from the disc 1, and linear-speed calculation means 26 determines a linear speed 27 from the head reproduced signal 25 and feeds it back to the rotation control section 21. Such rotation control is commonly executed by conventional spindle motors S.

Figure 8:
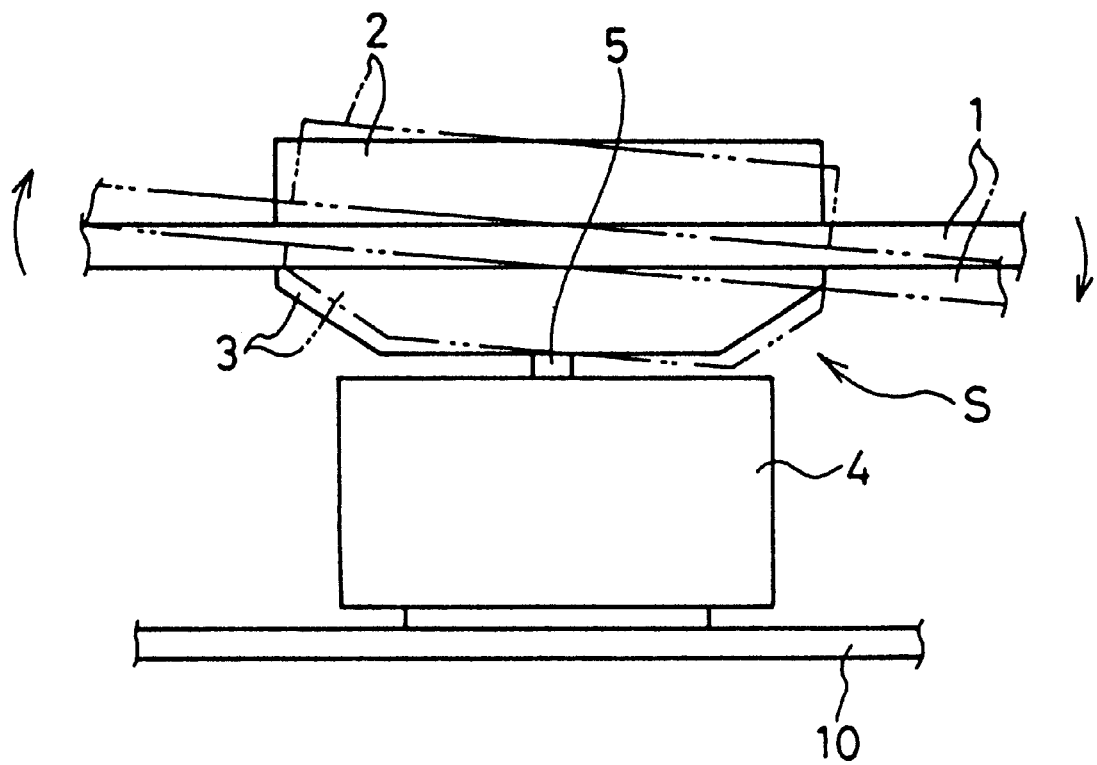
FIG. 8 is a side view showing a configuration of a conventional spindle motor.
Figure 9:
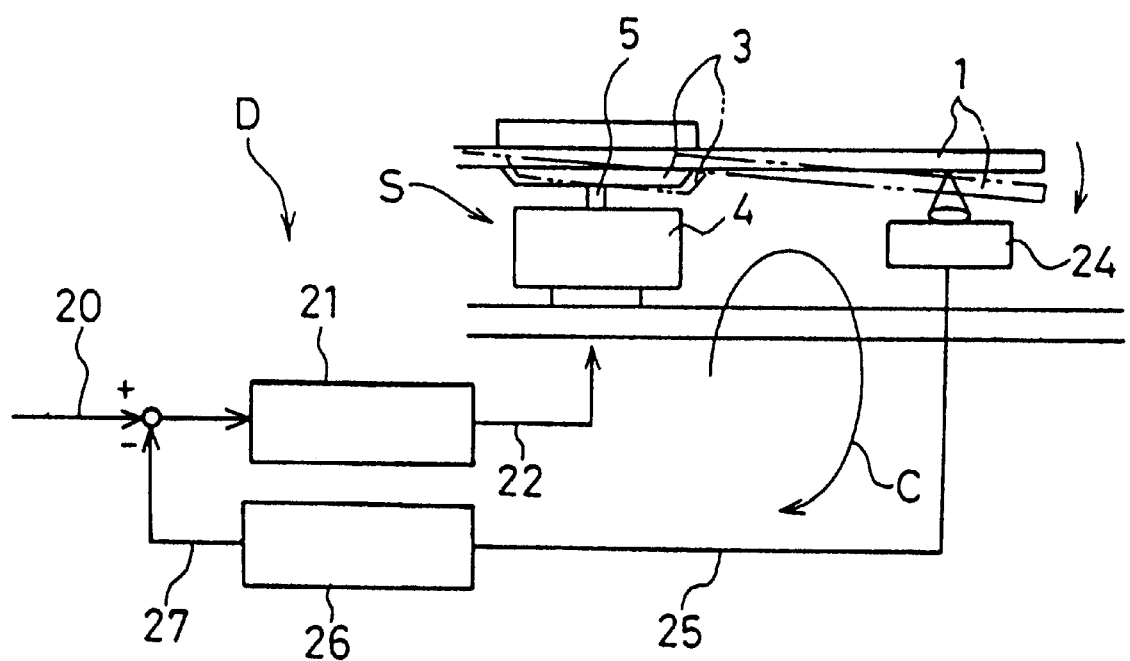
FIG. 9 is a block diagram showing rotation control effected by the conventional spindle motor.

The adhesive 8, however, eliminates the whirling seen in FIG. 8 from the path shown by arrow C in the FIG. 3. This is because the intervening adhesive 8 prevents the relative displacement between the rotor 4 and the turn table 3.

Figure 10:
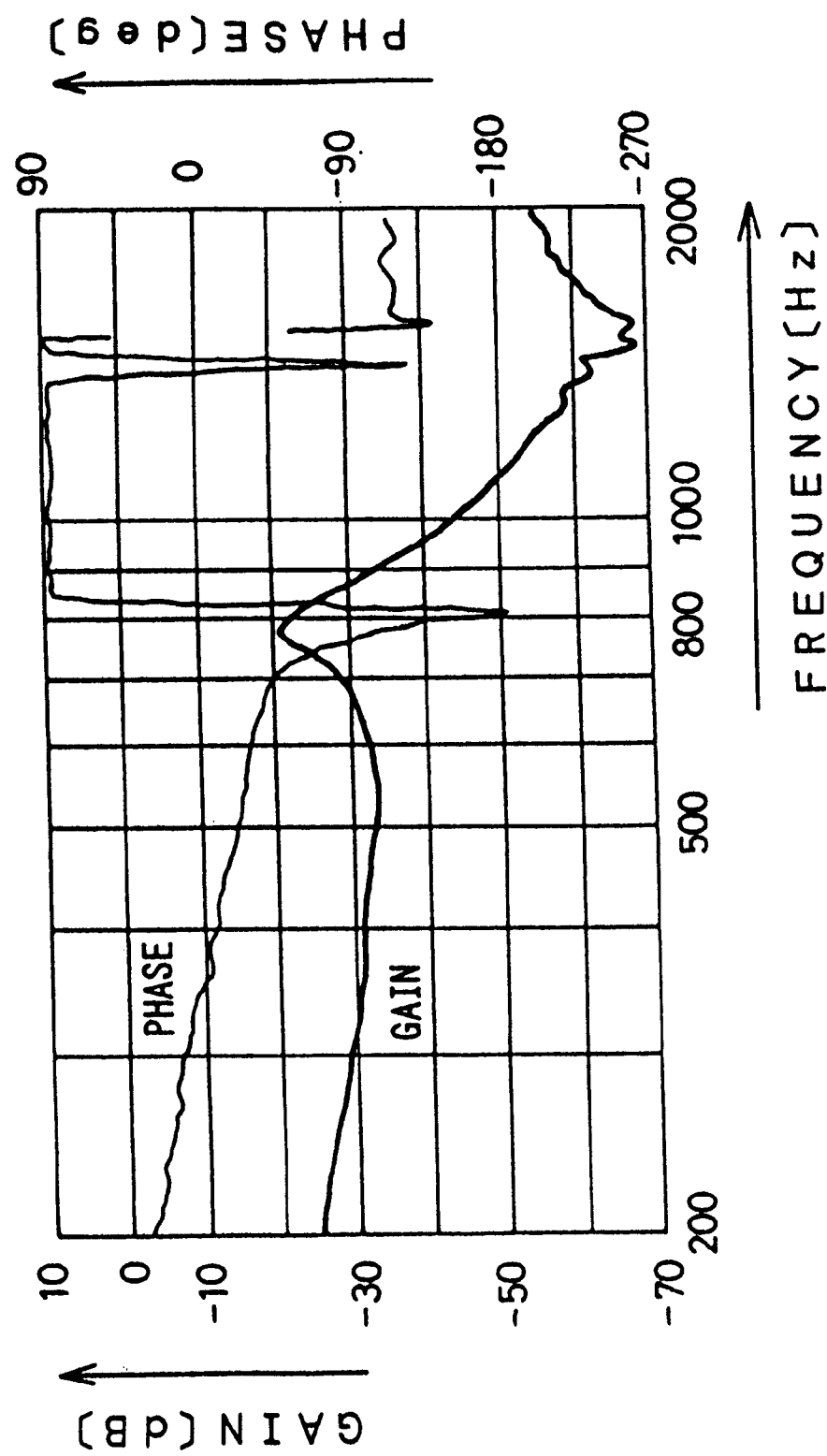
FIG. 10 is a characteristic diagram showing a CLV loop of the conventional spindle motor.

The elimination of the effects of unwanted vibration can be confirmed by measuring the loop characteristic of the control system. FIG. 4 is a characteristic diagram showing a CLV loop of the spindle motor S, wherein the horizontal axis indicates the frequency while the vertical axis indicates the gain and phase of the loop characteristic. This figure does not show the increase in gain observed near the frequency of 800 Hz in the CLV loop characteristic of the conventional example shown in FIG. 10, indicating that the unstable factor of the control system has been eliminated.

As described above, according to the first embodiment of this invention, the spindle motor S simultaneously meets both requirements of increasing the accuracy in holding the disc and reducing the unwanted vibration occurring when the disc is rotated at a high speed.

Although in the first embodiment, the rotating shaft 5 and the turn table 3 or rotor 4 are fixed together by means of press fitting, this invention is not limited to this aspect and the rotating shaft 5 and the turn table 3 or rotor 4 may be fixed together by means of adhesion or caulking while obtaining effects similar to those of the first embodiment.

Moreover, although in the first embodiment, the turn table 3 and the rotor 4 are stuck together by applying the adhesive 8 to three positions, this invention is not limited to this aspect, and the turn table 3 and the rotor 4 may be stuck together by applying the adhesive 8 to the entire outer circumference opposed to the protrusion 6 of the turn table 3 while the unwanted vibration can still be reduced as in the first embodiment.

By applying the adhesive 8 to the three positions on the outer circumference, however, only a small amount of adhesive 8 is required, thereby minimizing the effects of thermal expansion. At the same time, the adhesion gap 7 serves to make the adhesion layer uniform to prevent the apparatus from being affected by thermal expansion.

In addition, although in the first embodiment, the turn table 3 and the rotor 4 are fixed together by the adhesive 8, this invention is not limited to this aspect and the elastic member represented by silicon rubber may be filled instead of the adhesive 8 while the unwanted vibration can still be reduced. That is, any filler other than the adhesive 8 can be used as long as it can be filled in the gap 9 and as long as it limits the relative displacement between the turn table 3 and the rotor 4.

Furthermore, although the first embodiment has been described in conjunction with the assembly procedure for executing the adhesion and press-fitting processes simultaneously, the adhesive 8 may be filled in the adhesion gap 7 after the press fitting process. However, the assembly procedure for executing the adhesion and press-fitting processes simultaneously has an advantage of enabling the adhesive 8 to be applied from the top surface of the rotor 4 to allow the manufacturing process to be automated easily.

Figure 5:
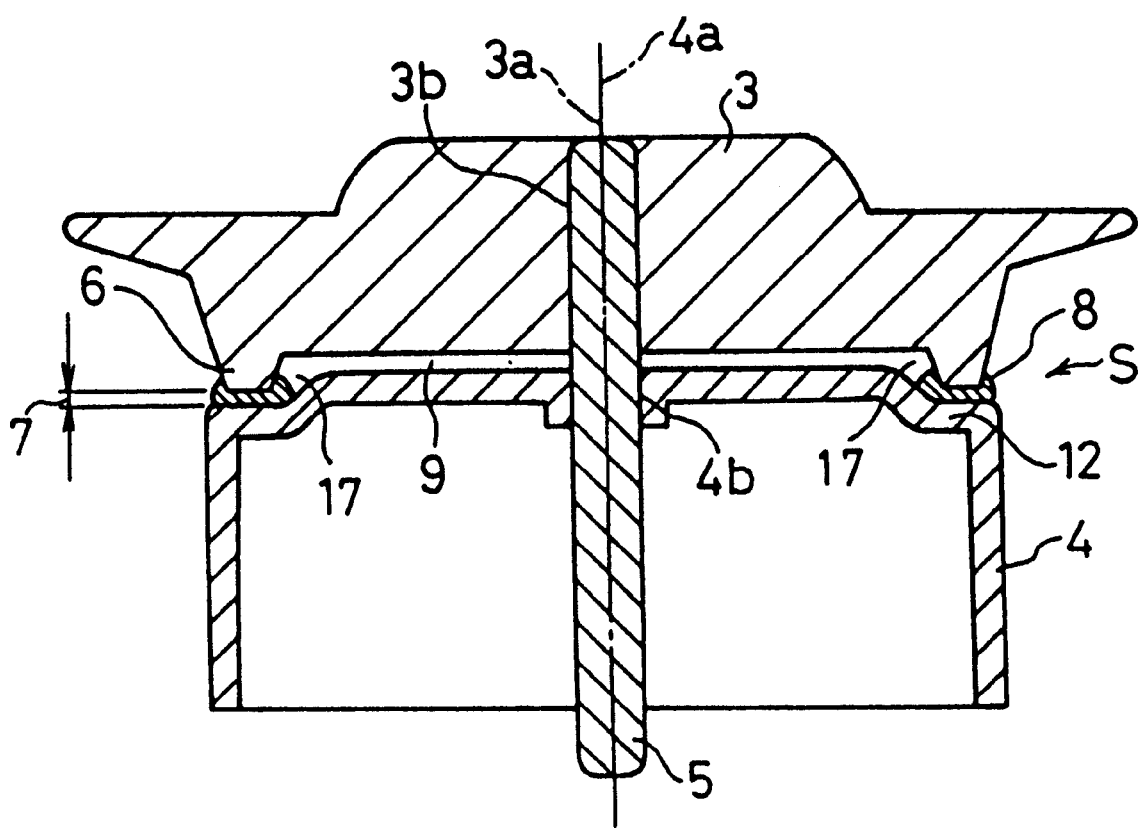
FIG. 5 is a sectional view showing a configuration of a spindle motor according to a second embodiment of this invention.

Next, a second embodiment of this invention is described with reference to the sectional view in FIG. 5. In a spindle motor S according to the second embodiment of this invention, an annular recessed portion 17 is formed on the outer edge 12 of the rotor 4, the protrusion 6 formed on the turn table 3 has a larger thickness due to the formation of the recessed portion 17, and the gap between the outer edge 12 and the protrusion 6 constitutes the adhesion gap 7. The other configuration is the same as in the first embodiment, so its description is omitted.

According to the second embodiment of this invention, the turn table 3 and the rotor 4 are stuck together by filling the adhesive 8 in the adhesion gap 7, as in the first embodiment. The adhesive 8 is applied to the entire circumference of the outer edge 12 or at three positions spaced at an approximately equal angle.

The effects of the spindle motor S according to the second embodiment of this invention are basically the same as those of the spindle motor S according to the first embodiment of this invention, and can reduce the unwanted vibration.

This spindle motor, however, differs from the spindle motor S according to the first embodiment of this invention in that the process for adhering the turn table 3 and the rotor 4 together can be controlled more easily. That is, this spindle motor uses the recessed portion 17 to prevent the leakage of the adhesive 8 into the turn table 3 which may occur if a large amount of adhesive 8 is applied.

Figure 6:
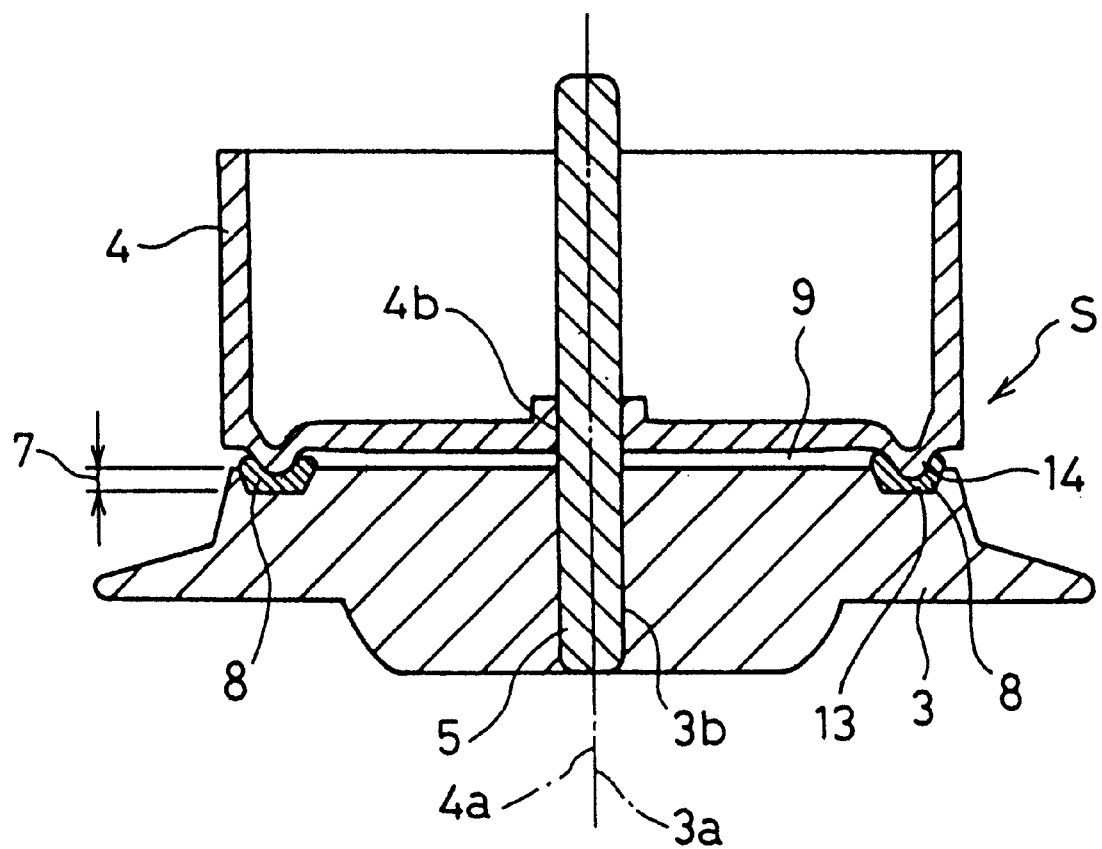
FIG. 6 is a sectional view showing a configuration of a spindle motor according to a third embodiment of this invention.

Next, a spindle motor S according to a third embodiment of this invention is described with reference to the sectional view in FIG. 6. In FIG. 6, the rotor 4 and the turn table 3 are turned upside down relative to each of the above embodiments.

In a spindle motor S according to the third embodiment, an annular protrusion 14 is formed on the outer edge of the rotor 4, and an annular groove 13 is formed in the outer edge of the turn table 3 so as to correspond to the protrusion 14. The protrusion 14 and the groove 13 constitute the adhesion gap 7.

The adhesive 8 is filled in the adhesion gap 7 to stick and fix the turn table 3 and the rotor 4 together. The manufacturing process applies the adhesive 8 to the groove 13 and then press-fits and fixes the turn table 3 to the rotating shaft 5.

The spindle motor S configured as described above according to the third embodiment can reduce the unwanted vibration as in the spindle motor S according to the first embodiment.

The spindle motor S according to the third embodiment differs from the spindle motor S according to the first embodiment in that the process for sticking the turn table 3 and the rotor 4 together can be controlled more easily. That is, the spindle motor S according to the third embodiment can collect the adhesive in the groove 13 provided in the turn table 3, thereby enabling the adhesion process to be controlled easily.

The press-fitting direction of the turn table 3 in the third embodiment of this invention is reverse to that in the first embodiment. This is because the selective change between the recessed and protruding portions allows the press-fitting direction of the turn table 3 to be freely selected, thereby increasing the degree of freedom of assembly in the process line.

Figure 7:
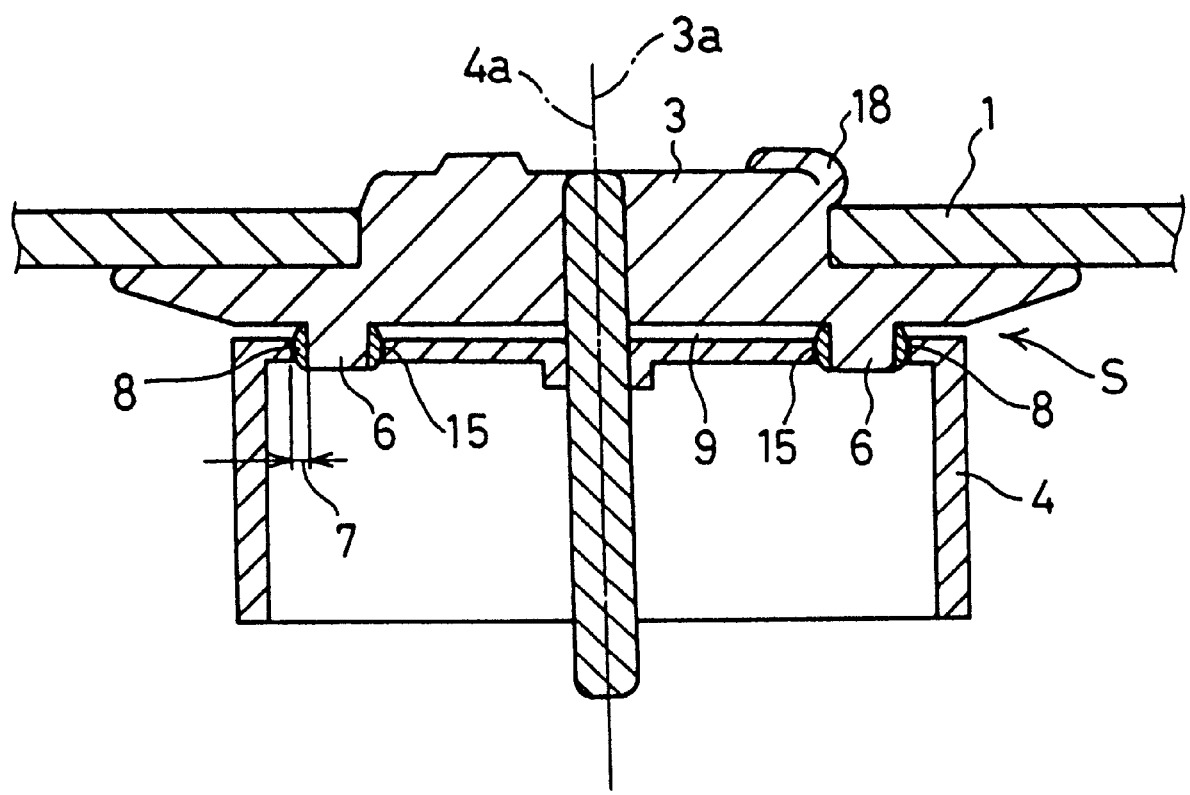
FIG. 7 is a sectional view showing a configuration of a spindle motor according to a fourth embodiment of this invention.

Next, a fourth embodiment of this invention is described with reference to the sectional view in FIG. 7. This figure shows a type in which the turn table 3 holds the disc 1 using a claw 18. In a spindle motor S according to the fourth embodiment of this invention, holes 15 are formed in the top surface of the rotor 4 at three positions spaced so as to have a predetermined gap therebetween, and protrusions 6, which were formed on the turn table 3, that are loosely inserted into the holes 15 so that the gap between the protrusions 6 and the holes 15 constitute the adhesion gap 7 when the protrusions 6 are inserted into the holes 15.

The adhesive 8 is filled in the adhesion gap 7 and the protrusions 6 are inserted into the holes 15 to stick and fix the turn table 3 and the rotor 4 together. The other configuration is the same as in the first embodiment.

In the spindle motor S configured as described above according to the fourth embodiment, the height occupied by the adhesion gap 7 is reduced by the part of it is common to the thickness of the rotor 4, thereby reducing the thickness of the entire apparatus. The other effects are the same as in the first embodiment, and this embodiment can reduce the unwanted vibration.

Although the fourth embodiment has been described in conjunction with the holes formed in the rotor 4, this invention is not limited to this aspect, the holes may be formed in the turn table 3 while the protrusions that are loosely inserted into the holes may be formed on the rotor 4. In this case, too, similar effects are obtained.

What is claimed is:

1. A spindle motor comprising a turn table that holds a disc to rotate it, a rotor that applies rotational driving force to the turn table, and a rotating shaft fixed to said rotor on the rotation axis of said rotor, characterized in that:

said turn table and said rotor are arranged so as to have a predetermined gap therebetween;

said rotating shaft is fixed on the rotation axis of said turn table using a first support means; and said turn table and said rotor are supported by a second support means consisting of a filler filled in said predetermined gap.

2. A spindle motor according to claim 1, wherein the gap between the turn table and the rotor is formed between the rotor and a protruding portion provided on the turn table in such a manner as to protrude to the rotor, or between the turn table and a protruding portion provided on the rotor in such a manner as to protrude to the turn table.

3. A spindle motor according to claim 1, wherein the gap between the turn table and the rotor is formed between the protruding portion of the turn table protruding to the rotor and a recessed portion provided in the rotor to oppose to the protruding portion of the turn table, or between the protruding portion of the rotor protruding to the turn table and a recessed portion provided in the turn table to oppose to the protruding portion of the rotor.

4. A spindle motor according to claim 3, wherein the recessed portion is a hole into which the protruding portion of the turn table or rotor is loosely inserted to form the gap between the turn table and the rotor.

5. A spindle motor according to claim 1, wherein the filler filled in the gap is an adhesive or an elastic member represented by silicon rubber.

6. A spindle motor according to claim 1, wherein the second support means supports the turn table on the rotational circumference of the rotor at least at three points spaced at an approximately equal angle.

7. A method for manufacturing a spindle motor for a disc apparatus comprising a turn table that holds a disc to rotate it, a rotor that applies rotational driving force to the turn table, and a rotating shaft fixed to said rotor on the rotation axis of said rotor, the method comprising the steps of:

filling a filler in said rotor or turn table;

fixing the rotating shaft on the rotation axis of said turn table using a first support means; and using a second support means obtained by hardening said filler in order to support said turn table and said rotor.

* * * * *